Figure 1:
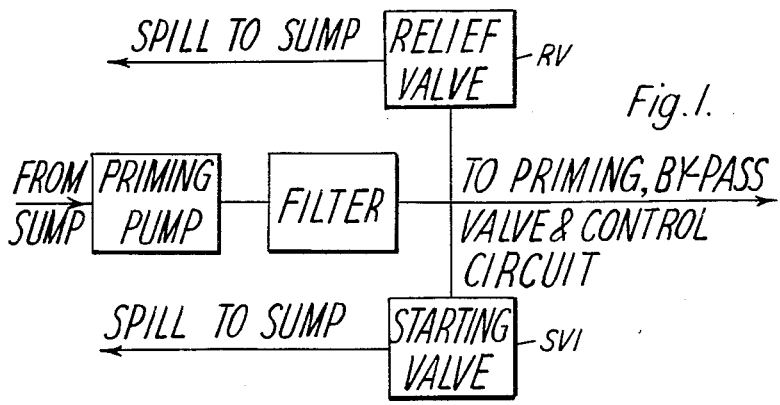

May 22, 1962  G. D. PAGE  3,035,593
HYDROSTATIC POWER TRANSMISSIONS
Filed July 20, 1960  2 Sheets-Sheet 1

GRAHAM DESBOROUGH PAGE  Inventor

By

Scrivener and Parker  Attorneys

May 22, 1962 G. D. PAGE 3,035,593
HYDROSTATIC POWER TRANSMISSIONS
Filed July 20, 1960 2 Sheets-Sheet 2
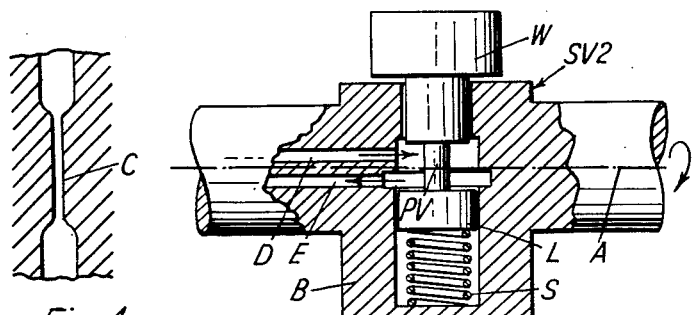
Fig.4. Fig.5.
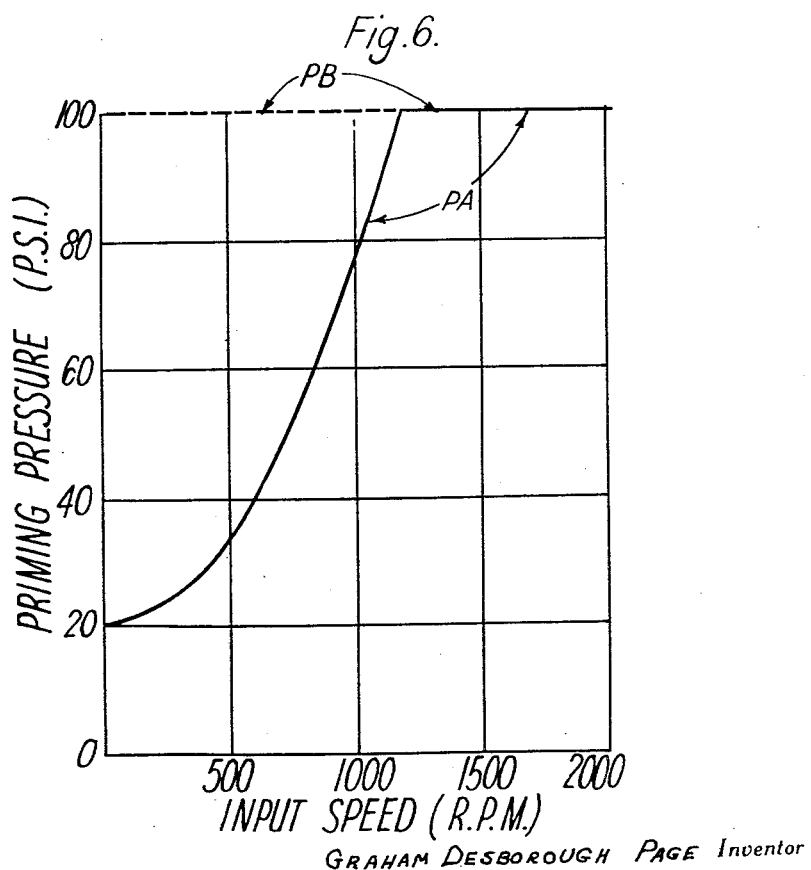
Graham Desborough Page Inventor
By
Scrivener and Parker Attorneys

United States Patent Office

3,035,593
Patented May 22, 1962

3,035,593
HYDROSTATIC POWER TRANSMISSIONS
Graham Desborough Page, Moseley, Birmingham, England, assignor to The Austin Motor Company Limited, Birmingham, England
Filed July 20, 1960, Ser. No. 44,089
2 Claims. (Cl. 137—56)

This invention relates to variable-ratio hydrostatic power transmissions (i.e. devices for transmitting power hydraulically from one or more positive displacement pumps to one or more positive displacement motors) of the type in which the working circuit, transmitting the power, is maintained primed at a positive pressure by at least one auxiliary pump (i.e. priming pump) supplying a low-pressure circuit; and also in which engagement of drive is carried out by the use of a valve (controlled centrifugally or otherwise) which constitutes the starting valve and which causes a controlling pressure to rise with increasing speed of the transmission input, this controlling pressure causing engagement of drive. Although the invention is applicable to transmissions of the foregoing type in which engagement of drive starts at a ratio of infinity to one, it is particularly applicable to transmissions of the kind in which engagement of drive is carried out at a fixed ratio.

In the case of hydrostatic power transmissions of the particular type specified above, and in which engagement of drive is carried out at a fixed ratio, the idling condition, namely, in which the associated prime mover is rotating but no drive is being transmitted, is achieved by interconnecting the high-pressure and low-pressure sides of the working circuit (i.e. the delivery and suction ports of the pump or pumps) by means of a by-pass circuit. As there is then no pressure difference across the pump or pumps, there is consequently no transmission of power to the motor or motors. The neutral condition of the transmission can either be achieved in the same way, or by disengagement of a driving member.

Engagement of the drive is effected by restricting the flow of hydraulic fluid around the by-pass circuit, thus establishing a pressure-drop across the pump or pumps and transmitting power to the motor or motors. The drive becomes fully engaged when the by-pass circuit is completely shut off, the whole of the fluid displaced by the pump or pumps then being delivered to the motor or motors. The initial restriction and final cut-off of the by-pass circuit is normally achieved by an increasing pressure acting on one end of a valve included in the by-pass circuit, in such a manner that as this pressure (termed the starting pressure) rises, the by-pass valve gradually closes until the by-pass is cut off entirely. In addition to the starting pressure, which is controlled by the starting valve previously mentioned, other forces act on the by-pass valve. These may include a spring force, or a force due to the hydraulic pressure in the by-pass circuit, or both of these forces together.

In connection with hydrostatic power transmissions of the type to which the present invention relates, it has already been proposed to employ, as the starting valve, a centrifugally-biassed relief valve supplied with hydraulic fluid by a priming pump and driven by a prime mover so that, as the speed of the prime mover is increased, the relief pressure of the starting valve (i.e. the starting pressure) increases so as to cause engagement, as described above. With this arrangement the priming pressure, at idling, in the neutral condition and during engagement of the drive, is always the same as the starting pressure. Thus, dropping of pressure by the starting valve may result in a deficiency of priming pressure during these conditions, namely, when the priming pressure is not high enough to keep the working circuit completely full.

It must be pointed out that the need for a high priming pressure during the drive-engaging period is most important, since engagement is usually carried out at the lowest ratio, which normally means that the pressure in the working circuit is a maximum. Consequently the leakage from the working circuit is then a maximum, and hence the need for a high priming pressure is greatest. Incomplete filling of the working circuit can result in one or more of these disadvantages; (a) production of excessive noise due to cavitation and the presence of air in the system; (b) interruption of drive, causing jerky starting; and (c) mechanical damage to the transmission due to snatches in the drive, and so forth. A further disadvantage of the prior system is that, in certain conditions, the transmission is required to change ratio while the prime mover is rotating at a speed less than that needed for full engagement of the drive. In other words, whilst the starting pressure is below its maximum value. This may result in inadequate hydraulic pressure for ratio changing.

The present invention, which is intended to obviate or minimize the disadvantages mentioned above, lies in the manner of supplying hydraulic fluid to the starting valve. Instead of allowing the delivery of the priming pump or pumps to be relieved by the starting valve, in accordance with this invention it is controlled by another relief valve which is set to a pressure that is always sufficient for the purpose of priming the working circuit. From the priming pump delivery, a small restricted feed is supplied to the starting valve by providing a fluid-flow restrictor; for example, a restricted orifice or a capillary device. The starting valve may be of the centrifugal type and arranged to be driven by the prime mover pertaining to the transmission device. Alternatively the starting valve may be of the non-centrifugal type, such as one which is responsive to the flow of fluid delivered by the priming pump. Fluid spilled by the relief valve and by the starting valve is returned to a sump from which the priming pump takes its supply.

With the improved system the priming pressure is always maintained at the requisite value, the starting pressure being controlled separately. The restricted feed to the starting valve need only be small, since the amount of fluid the feed has to supply is only the quantity needed to displace the usual by-pass valve from the fully-open to the fully closed position. It follows that the starting valve itself needs only to be very small, which is a further advantage afforded by the invention. Hitherto the size of the starting valve has been determined by the fact that this valve had to be sufficiently large to relieve the full delivery of the priming pump, whereas with this invention it only has to relieve a much smaller quantity of hydraulic fluid.

It should perhaps be mentioned that, in addition to affording the advantages already stated, the invention ensures adequate hydraulic pressure for ratio changing within the range of engagement speeds.

Figure 2:
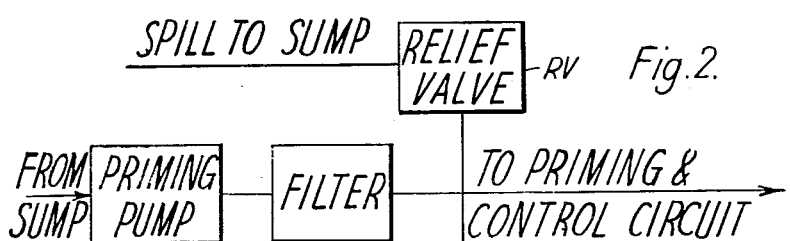
Figure 3:
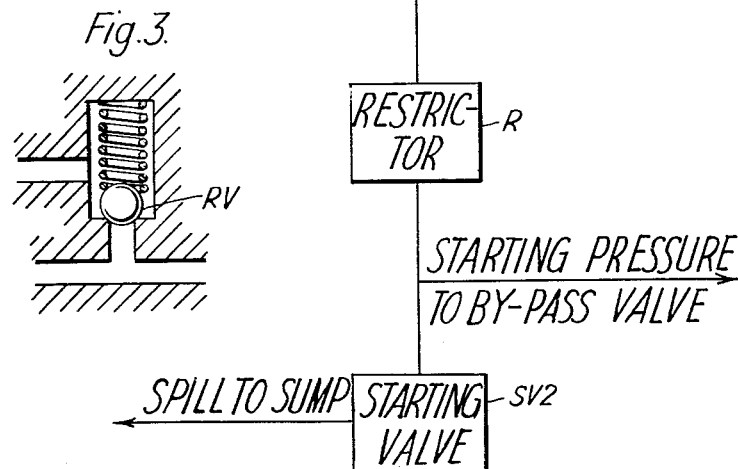

Referring to the accompanying drawings:
FIGURE 1 represents schematically a portion of a known hydrostatic power transmission system of the type to which the present invention relates;
FIGURE 2 represents schematically the same portion of the system as modified in accordance with the invention;
FIGURE 3 shows the construction and arrangement of the relief valve of FIGURE 1 or FIGURE 2;
FIGURE 4 illustrates a capillary device which may constitute the restrictor of FIGURE 2;
FIGURE 5 shows the construction and arrangement of a centrifugally-biassed valve which may constitute the starting valve of FIGURE 1 or FIGURE 2; and FIGURE 6 depicts graphically the operating conditions which obtain in the prior system (FIGURE 1) and in the improved system (FIGURE 2), respectively.

In the case of the prior system (FIG. 1) a starting valve SV1 is constituted by a centrifugally-biassed relief valve, as referred to in the introductory part of this specification, and that valve is driven by a prime mover (not shown). A relief valve RV is set to blow off at a pressure of the order of 100 p.s.i. Consequently, the priming pressure, at idling, in the neutral condition of the transmission and during engagement of the drive, is the same as the relief pressure of the starting valve SV1, namely, the starting pressure. For example, in a typical case, at an input speed of 600 r.p.m. the starting pressure is about 40 p.s.i. This is also the priming pressure, and it is inadequate both for ensuring complete filling of the working circuit of the transmission, and for ratio changing. The priming pressure needs to be of the order of 100 p.s.i., and this requirement is not satisfied by the prior system until the input speed is about 1200 r.p.m. (see FIG. 6).

In the improved system (FIG. 2) the relief valve RV, as before, is set to blow off at a pressure of about 100 p.s.i., but, in contrast to the prior system, it is this valve that now determines and controls the priming pressure. This is effected by providing a fluid-flow restrictor R which allows only a small flow of fluid from the priming pump to pass to the starting valve SV2, with the result that the fluid spilled by that valve does not appreciably affect the priming pressure which is governed by the relief valve RV. The latter, as can be seen from FIGURE 3, is constituted by a spring-loaded ball-valve. The restrictor R may be a restricted orifice, or, as shown in FIGURE 4, may consist of a capillary device C.

Although, as previously indicated, the starting valve SV2 may be of the non-centrifugal type, it is represented in FIGURE 5 as being of the known centrifugally-biassed type. It comprises a differential piston valve unit PV mounted in a valve body B which is arranged to be driven, about the axis A, by the prime mover referred to previously. Initially, in the operation of the improved system, the condition of the starting valve SV2 is as represented in FIGURE 5. The small flow of pressure-fluid passed by the restrictor R (FIG. 2) enters the valve chamber through a duct D, and causes the differential piston unit PV to assume the position shown, the fluid pressure overcoming a compression spring S. The hydraulic fluid escapes by way of a spill duct E.

As the rotational speed of the starting valve SV2 increases, a weight W, attached to the valve unit PV, moves outwardly, due to centrifugal action. The resultant outward force, which includes the force exerted by the spring S, opposed the effect of the hydraulic pressure on the valve unit PV, so that the port of the spill duct E becomes progressively obstructed by the larger-diameter piston L of the valve unit PV. When that port has become fully obturated, the requisite starting pressure is established.

The radical difference between the prior system (FIG. 1) and the improved system (FIG. 2) can readily be appreciated from FIGURE 6. The curve PA applies to the system shown in FIGURE 1, and indicates that the starting valve SV1 does not enable the requisite priming pressure of about 100 p.s.i. to be attained at an input speed lower than 1200 r.p.m. The curve PB indicates that, in the case of the system shown in FIGURE 2, the relief valve RV is effective to afford the requisite priming pressure of 100 p.s.i. even at the lowest input speed.

I claim:
1. In a hydrostatic power transmission system of the type which includes a sump for hydraulic fluid and a priming pump for delivering positive pressure from said sump to the inlet of said system, said system also including a normally open pressure responsive by-pass valve for normally returning the outlet of said system to said sump, the improvement which includes a normally open starting valve for returning a portion of the fluid from the outlet of said priming pump to said sump, means for progressively closing said starting valve as the speed of said pump increases, to gradually shut off the return of fluid to said sump and to connect the priming pump outlet to said by-pass valve to close the latter, a restrictor interposed between the outlet of said priming pump and said starting valve to maintain the outlet pressure of said priming pump at a predetermined high value, and a second by-pass valve also connected to the outlet of said pump for by-passing to said sump fluid pressure in excess of said predetermined high valve.

2. In a variable-ratio hydrostatic power transmission of the type having a fluid working circuit provided with high and low pressure sides connected by a normally open by-pass valve, a priming pump for priming the high pressure side of said circuit at a positive pressure, a normally open starting valve connected to the outlet of the priming pump for by-passing a portion of the fluid from the outlet of the pump, means for gradually closing the starting valve as the speed of the pump increases to shut off the flow of by-passed fluid and for supplying said fluid to said by-pass valve to close the same, the improvement which comprises means for ensuring delivery of a predetermined high pressure to said circuit, said means including a restrictor positioned between the pump outlet and the starting valve, and a second by-pass valve connected to the pump outlet for by-passing fluid pressure in excess of said predetermined high pressure.

References Cited in the file of this patent

UNITED STATES PATENTS

| | | |
|---|---|---|
| 2,155,247 | Warner | Apr. 18, 1939 |
| 2,637,353 | Hyslop | May 5, 1953 |
| 2,674,854 | Church | Apr. 13, 1954 |